No. 895,423. PATENTED AUG. 11, 1908.
W. S. BROWN.
BOX CONNECTION.
APPLICATION FILED MAR. 27, 1907.
Fig. 1
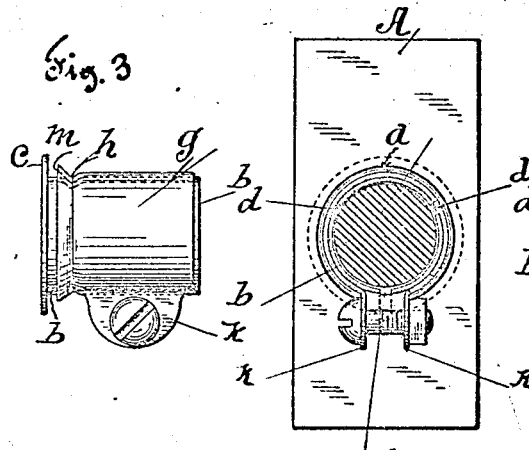
Fig. 3
Fig. 4
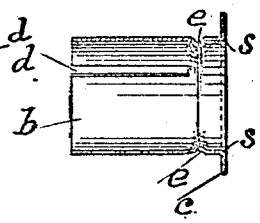
Fig. 6.
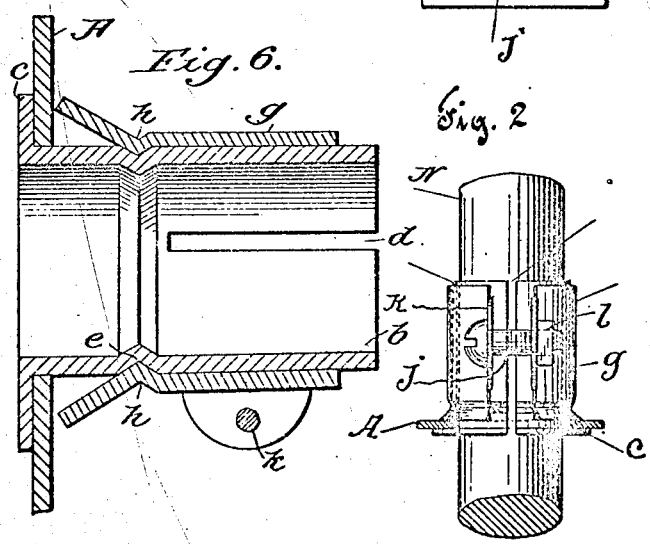
Fig. 2
Fig. 5
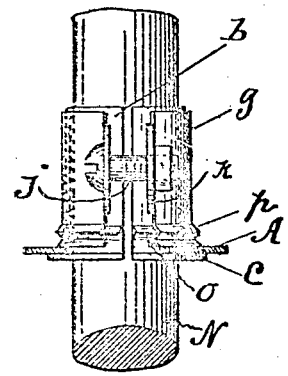
WITNESSES:
Charles Kanimann
W. Brown
INVENTOR
William S. Brown
BY
D. Walter Brown
his ATTORNEY

UNITED STATES PATENT OFFICE.

WILLIAM S. BROWN, OF NEW YORK, N. Y.

BOX CONNECTION.

No. 895,423.

Specification of Letters Patent.

Patented Aug. 11, 1908.

Application filed March 27, 1907. Serial No. 364,823.

*To all whom it may concern:*

Be it known that I, WILLIAM S. BROWN, a citizen of the United States of America, and a resident of the borough of Manhattan, city and State of New York, have invented certain new and useful Improvements in Box Connections, of which the following is a specification.

This invention relates to improvements in box connections for electric wires, cables, and protecting tubes, as well as conduits generally.

The purpose of the invention is to provide a device which can be readily spun or struck up from sheet metal, requiring no castings, can be readily connected and disconnected with and from the box, and which is so constructed and arranged that a single operation will both fasten the connection firmly to box, and clamp it on the insulated wire, cable or conduit.

Referring to the drawings which accompany the specification to aid the description, Figure 1 is a cross section partly in elevation, of a box, connection and insulated cable. Fig. 2 is an elevation of the device on a cable, and showing one means for clamping the outer sleeve on the split sleeve and against the box wall at a single operation. Fig. 3 is a side elevation of the two sleeves. Fig. 4 is a longitudinal section of the inner sleeve. Fig. 5 is an elevation of a modification. Fig. 6, is a broken longitudinal section through the axis of the sleeves. The cable or conduit is omitted for sake of clearness.

Referring to Figs. 1 to 4 inclusive, A being a side or end of the box and provided with a hole $a$ through which the connection passes, the said connection consists of an inner split sleeve $b$ preferably spun or struck up of sheet metal, and provided with a flange or shoulder $c$ to engage said wall A, $d\ d$ being the slits in said sleeve $b$. Said sleeve $b$ is provided with one member of a locking device and the outer sleeve $g$ is provided with another member of a locking device, which is preferably constructed as follows: A circumferential groove $e$ is formed in said sleeve $b$ of such shape, that, when a corresponding projection $h$ on the outer sleeve $g$ is forced down into said groove $e$, the end of said outer clamping sleeve will move hard against and clamp the box wall $a$ between said flange $c$ and the end of sleeve $g$, as will be hereinafter more fully explained. Said clamping sleeve $g$, which is open on one side, and preferably spun or struck up of sheet metal, is provided with any suitable device for clamping it on said inner sleeve $b$, and such device may be a screw $j$ passed through holes in lugs $k$ on said sleeve $g$ and tightened by a nut $l$.

The parts are assembled and operated as follows, N being an armored or insulated cable. Said split sleeve $b$ is passed out through the hole in the box wall $a$, and the end of said cable N is passed through the said sleeve $b$, the shoulder formed on the inside of said sleeve $b$, preventing the armored wrapping of said cable from entering the box, and only the insulated wires passing in. Then the clamping sleeve $g$ is slipped on over said sleeve $b$, until the projection $h$ registers with said groove $e$. Then the edges of the said sleeve $g$ are drawn together by the screw $j$ and nut $l$, and as the clamping sleeve tightens the engagement of said projection $h$ with said groove $e$ causes the end of the sleeve $g$ to move hard against said box wall $a$ and clamp the same between the said shoulder $c$ and said end $m$, while at the same time, the clamping sleeve $g$ compresses the inner sleeve $b$ firmly upon the cable N. Thus by one operation the connection is clamped to the cable and to the box.

Referring to Fig. 5, the parts are in general similar to corresponding parts indicated by the same reference letters in Figs. 1 to 4, but in place of the groove $e$ there is now a V-projection $o$ on said inner sleeve $b$ and a corresponding V-groove $p$ on said clamping sleeve $g$; and it will be evident, as to both modifications that one or more separate projections might be formed on the inner or outer sleeve with one or more corresponding recessed parts on the outer member instead of having continuous circumferential grooves or continuous circumferential projections. Sleeve $b$ is preferably rounded at $s$ to prevent injury to the insulation.

Now having described my improvements, I claim as my invention

1. A box connection characterized by the following elements, an inner sleeve adapted to engage one side of the box wall, and having a member of a locking device thereon with a surface inclined inwardly toward said box wall, an outer sleeve adapted to engage the other side of said box wall and to fit on said inner sleeve, and said outer sleeve being provided with another member of said locking device having a surface adapted to engage said first named surface, substantially as described.

2. The combination in a box connection, of an inner sleeve adapted to receive a conduit or cable and to engage one side of a box wall, and having one member of a locking device thereon provided with a surface inclined inwardly toward said box wall, an outer clamping sleeve adapted to compress said inner sleeve on said conduit or cable, said outer sleeve being provided with another member of a locking device adapted to engage the other side of said box wall, and having a surface adapted to contact with said inclined surface, and means adapted to compress said outer sleeve on said inner sleeve, substantially as described.

3. The combination in a box connection of an inner compressible sleeve for a conduit or cable adapted to engage the inner side of a box wall, said inner sleeve being provided with one member of a locking device having a surface inclined inwardly toward said box wall, an outer clamping sleeve adapted to compress said inner sleeve on said conduit or cable, and having an end adapted to engage the outside of said box wall, and said outer sleeve being provided with another member of a locking device having a surface adapted to contact with said inclined surface of the inner sleeve, whereby said sleeves clamp said box wall and means adapted to clamp said outer sleeve on said inner sleeve, substantially as described.

4. The combination in a box connection, of an inner compressible sleeve $b$ adapted to contact with one side of the box wall, and provided with a groove $e$ with an inclined surface, an outer sleeve $g$ adapted to contact with the other side of said box wall, and to clamp on said sleeve $b$, and a projection $h$ with inclined surfaces on said outer sleeve $g$ adapted to engage with the inclined surface of said groove $e$, whereby said sleeves $b$ and $g$ clamp said box wall, and means to clamp said sleeve $g$ on said sleeve $b$, substantially as described.

Signed at New York city this 15th day of March 1907.

WILLIAM S. BROWN.

Witnesses:
   HENRY H. DE VOS,
   DAVID WALTER BROWN.